(12) United States Patent
Suzuki et al.

(10) Patent No.: US 8,278,553 B2
(45) Date of Patent: Oct. 2, 2012

(54) HARNESS MODULE DEVICE

(75) Inventors: Hitoshi Suzuki, Saitama (JP); Fumihiro Okazaki, Saitama (JP); Takeshi Anzai, Saitama (JP); Kazuhiko Horikoshi, Saitama (JP); Takeshi Ogasawara, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 531 days.

(21) Appl. No.: 12/310,534

(22) PCT Filed: Sep. 25, 2007

(86) PCT No.: PCT/JP2007/068557
§ 371 (c)(1),
(2), (4) Date: Feb. 27, 2009

(87) PCT Pub. No.: WO2008/038631
PCT Pub. Date: Apr. 3, 2008

(65) Prior Publication Data
US 2010/0186983 A1    Jul. 29, 2010

(30) Foreign Application Priority Data

Sep. 25, 2006  (JP) ................................ 2006-258375
Feb. 2, 2007   (JP) ................................ 2007-024864
May 23, 2007   (JP) ................................ 2007-136810

(51) Int. Cl.
| | |
|---|---|
| H01B 7/00 | (2006.01) |
| H02G 3/04 | (2006.01) |
| H05K 5/02 | (2006.01) |
| H05K 1/00 | (2006.01) |
| H05K 7/14 | (2006.01) |
| H05K 7/18 | (2006.01) |
| H05K 9/00 | (2006.01) |
| H02B 1/00 | (2006.01) |
| H01R 12/00 | (2006.01) |

(52) U.S. Cl. ......... 174/72 A; 174/51; 174/254; 361/601; 361/800; 361/816; 361/818; 439/76.2

(58) Field of Classification Search ................... None
See application file for complete search history.

(56) References Cited

U.S. PATENT DOCUMENTS 4,823,217 A * 4/1989 Kato et al. ................. 360/246.8
(Continued)

FOREIGN PATENT DOCUMENTS

JP        11-215651        8/1999
(Continued)

OTHER PUBLICATIONS

Supplementary European Search Report issued Feb. 17, 2010 in EP 07 80 7829.

(Continued)

*Primary Examiner* — Jayprakash N Gandhi
*Assistant Examiner* — Dion Ferguson
(74) *Attorney, Agent, or Firm* — Wenderoth, Lind & Ponack, L.L.P.

(57) ABSTRACT

A harness module structure includes a module mounting portion, which is formed upon an obverse surface of a steering support member, which extends in approximately the direction of the width of a vehicle. A harness module is installed upon the module mounting portion. The harness module includes a harness module body proper, and a module cover, which is mounted upon the harness module body proper. The harness module body proper is enclosed by the module cover and the module mounting portion, and the module cover includes a grounding portion with respect to the module mounting portion, such that the harness module body proper has an interstice with respect to the module mounting portion, and is supported in a non-contact state thereupon, by way of the grounding portion.

7 Claims, 6 Drawing Sheets

U.S. PATENT DOCUMENTS

| | | | | |
|---|---|---|---|---|
| 5,353,190 | A | * | 10/1994 | Nakayama et al. ............ 361/647 |
| 5,608,611 | A | | 3/1997 | Szudarek et al. |
| 5,711,675 | A | | 1/1998 | Nishitani et al. |
| 5,895,889 | A | * | 4/1999 | Uchida et al. ................ 174/72 A |
| 6,018,509 | A | * | 1/2000 | Itoh et al. ...................... 720/685 |
| 6,291,770 | B1 | | 9/2001 | Casperson |
| 2001/0002623 | A1 | | 6/2001 | Tsunoda et al. |

FOREIGN PATENT DOCUMENTS

| | | |
|---|---|---|
| JP | 11-346424 | 12/1999 |
| JP | 2002-220011 | 8/2002 |
| JP | 2004-180487 | 6/2004 |
| JP | 2005-88845 | 4/2005 |
| JP | 2005-158931 | 6/2005 |
| JP | 2006-044587 | 2/2006 |
| JP | 2006-107809 | 4/2006 |
| WO | 00/70723 | 11/2000 |

OTHER PUBLICATIONS

International Search Report issued Nov. 13, 2007 in the International (PCT) Application of which the present application is the U.S. National Stage.

Japanese Office Action mailed Nov. 8, 2011 in Japanese Patent Application No. 2007-136810.

* cited by examiner

HARNESS MODULE DEVICE

TECHNICAL FIELD

The present invention relates to a harness module device.

BACKGROUND ART

Typically, an instrument panel is installed within a forward portion of a passenger compartment of a vehicle, such as an automobile. A metallic vehicle body reinforcing material, which extends in a direction of a width of the vehicle, is positioned within an interior portion of the instrument panel thereof. The vehicle body reinforcing material is a metallic material, i.e., a metallic vehicle body material, which links a left and a right vehicle body panel, and is referred to as a cross car beam, or, by virtue of supporting a steering column, a steering support member.

Conversely, a wire harness, which is referred to as a main harness, is installed in a line with the vehicle body reinforcing material. As an instance thereof, a wire harness A, such as is depicted in FIG. 13, bundles together a plurality of a wire type B, and such as a connector is mounted upon a terminus portion of each respective wire type B thereof.

A shielding characteristic of such a wire harness A is demanded against a noise that is generated by a noise generation source C that is external thereto, and a shielding characteristic of such a wire harness A is also demanded against a noise that is generated by a noise generation source D that is internal thereto, such as is depicted in FIG. 14A and FIG. 14B. As a consequence thereof, an expensive shielded wire, with a thick diameter, is employed as the wire type B thereof. It is to be understood that the noise generation source C that is external to the wire type B may comprise an electrical component such as an electric motor, an inverter, or an electric power supply device. In addition, an electric wave noise may also arise external to the vehicle. Conversely, the noise generation source D that is internal to the wire type B may comprise a wire that is within the wire type B thereof.

A problem arises with such a crucial wire harness, which is long, and comprising the thick diameter, in that the wire harness thereof is expensive and difficult to work with. Accordingly, making the wire harness thereof into a modular construction, with an objective of making the wire harness thereof inexpensive, lightweight, and easy to work with, has been studied; refer, as an instance thereof, to Japanese Patent Application Laid Open No. 2005-158931, and Japanese Patent Application Laid Open No. 2006-44587.

With regard to the conventional wire harness A, however, an expensive shield wire, comprising a thick diameter, is employed with the wire type B, in order to ensure the shielding characteristic thereof against the noise generation source C or D that is external or internal thereto, as is described herein. As a consequence thereof, a problem arises wherein an overall thickness of the wire type B increases, resulting in a long wire harness with a thick diameter that is difficult to work with. In addition, a problem arises wherein it is difficult to position such a thick wire harness in a close proximity to the noise generation source C that is external thereto. Furthermore, with regard to the conventional wire harness A, a location of the wire type B that is bundled together therein is distinct from one another, as is depicted in FIG. 14A and FIG. 14B. As a consequence thereof, reproducibility with respect to a malfunction caused by the noise is low, and it has thus been difficult to take a countermeasure for preventing a recurrence thereof.

In addition, the module, i.e., the harness module that is disclosed according to Japanese Patent Application Laid Open No. 2005-158931 comprises a structure wherein a plurality of length substrates are layered one upon another. A problem of an increased cost arises as a consequence thereof. In addition, the module, i.e., the harness module that is disclosed according to Japanese Patent Application Laid Open No. 2006-44587 comprises a structure wherein a plurality of wires is left unused. A problem arises as a consequence thereof, in that a weight reduction or an improvement in an ease of working with the module, i.e., the harness module, thus disclosed is insufficient therewith.

SUMMARY OF THE INVENTION

It is an objective of the present invention to provide a harness module that is inexpensive, lightweight, and uncomplicated to work with.

In order to achieve the objective, a harness module device according to an embodiment of the present invention comprises a module mounting portion, which is formed upon a metal portion of a vehicle body, and a harness module, which is positioned upon the module mounting portion. The harness module comprises a harness module body proper, and a module cover, which is capable of protecting the harness module body proper. The module cover is configured such that the harness module body proper is approximately completely enclosed over both surfaces thereof by the module cover and the module mounting portion, by way of the module cover being mounted upon a surface of the harness module body proper that is opposite to a surface of the module mounting portion of the harness module body proper. The module cover comprises a grounding portion with respect to the module mounting portion, whereby the harness module body proper is supported in a non-contact state with respect to the module mounting portion (i.e., there is an interstice between the harness module body proper and the module mounting portion).

DESCRIPTION OF REFERENCE NUMBERS

Figure 1:
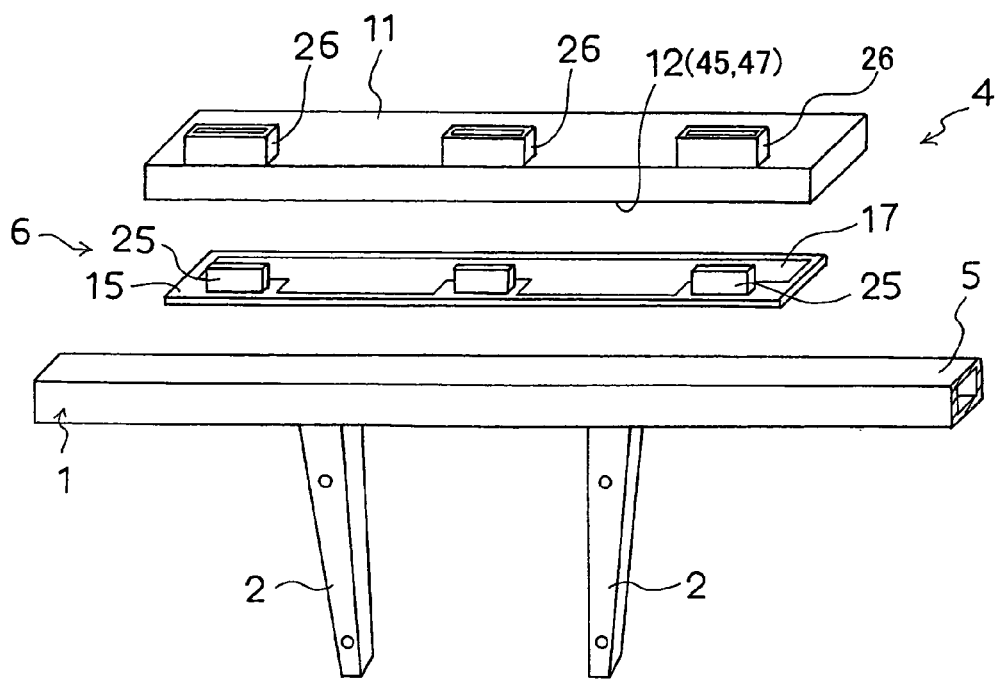
FIG. 1 is an exploded perspective view of a harness module device according to a first embodiment of the present invention.

1. Metallic Vehicle Body Portion (Steering Support Member)
4. Harness Module
5. Module Mounting Portion
6. Harness Module Body Proper
11. Module Cover
12. Grounding Portion
13. Interstice
15. Length Substrate, i.e., Substrate Portion
16. Signal Wire Portion
17. Ground Portion
22. Hook Portion
27. Signal Wire
28. Power Supply Wire
29. Grounding Wire
30. Electrical Component
31. Substrate, i.e., Substrate Portion
32. Substrate, i.e., Substrate Portion
33. Tape Wire
35. Under Cover
36. Perforation
37. Rib
45. Electrical Grounding Unit
46. Electroconductive Material, for Multiple Point Grounding
47. Electroconductive Material, for Either Line or Plane Grounding

DETAILED DESCRIPTION OF THE INVENTION

Following is a detailed description of concrete embodiments of the best mode for carrying out the invention, with reference to the attached drawings.

First Embodiment

FIG. 1 to FIG. 7 illustrate a first embodiment of a harness module device according to the present invention. The harness module device according to the embodiment includes a module mounting portion 5, which is installed upon a metallic vehicle body portion, a steering support member 1 as an instance thereof, and a harness module 4 that is positioned upon the module mounting portion 5.

In the present circumstance, an instrument panel (not shown) is installed upon a fore portion of a passenger compartment within a vehicle such as an automobile. A metallic vehicle body reinforcing material, which extends in an approximate direction of a width of the vehicle, is positioned within an interior portion of the instrument panel thereof. The vehicle body reinforcing material is made of a metallic material, i.e., a metallic vehicle body material, which links a left and a right vehicle body panel, and is referred to as a cross car beam, or, by virtue of supporting a steering column, a steering support member 1; refer to FIG. 1 for particulars.

While the steering support member 1 is normally configured of a cylindrical iron pipe, in recent years the steering support member 1 has been manufactured from a lightweight alloy, such as a magnesium alloy or an aluminum alloy. A steering support member 1 that is manufactured from a lightweight alloy thereof may be formed by an extrusion into a pipe shape, whether an angular pipe or a cylindrical shape, or formed into a non-pipe shape by a metal casting. According to the embodiment, the steering support member 1 is formed into an angular pipe, comprising a rectangular cross-section. It is to be understood, however, that the steering support member 1 is not limited to the forms described herein. It is further to be understood that in the present circumstance, each face of the steering support member 1 of the rectangular shape will be oriented in a vertical direction, as well as in a direction along a length of the vehicle. In addition, it is typical for a stay 2 to be installed upon a lower surface of the steering support member 1, in order to cause a midsection thereof to be supported upon a floor panel of the vehicle. While the steering support member 1 is both optimal and crucial as the metallic vehicle body portion, it is to be understood that the metallic vehicle body portion is not limited thereto. The description according to the embodiment will pertain to a circumstance wherein the metallic vehicle body portion is the steering support member 1.

The module mounting portion 5 is formed in a level plane, which is capable of being positioned so as to be directly in contact with the harness module 4, as an instance thereof. It is to be understood that the steering support member 1 of the rectangular shape is capable of using each respective surface thereof as the module mounting portion 5, thereby simplifying a mounting of the harness module 4 thereupon. In the present circumstance, it is presumed that an upper surface of the harness module 4 is used as the module mounting portion 5 thereof. While it would be optimal for the module mounting portion 5 to include a level plane, it is to be understood that it would also be possible for a bracket to be mounted thereupon, and to be treated as the module mounting portion 5 thereof, in a circumstance wherein a sufficiently level plane thereof cannot be ensured. In addition, it would also be possible for the module mounting portion 5 to form a structure that combines a level plane with a bracket.

With regard to such a configuration thereof, the harness module 4 includes a harness module body proper 6, and a module cover 11, which is capable of protecting the harness module body proper 6. In the present circumstance, the harness module body proper 6 is configured to include, at a minimum, a function that is approximately equivalent to a function of a wire harness that is formed by bundling a plurality of conventional-type wires.

Figure 2:
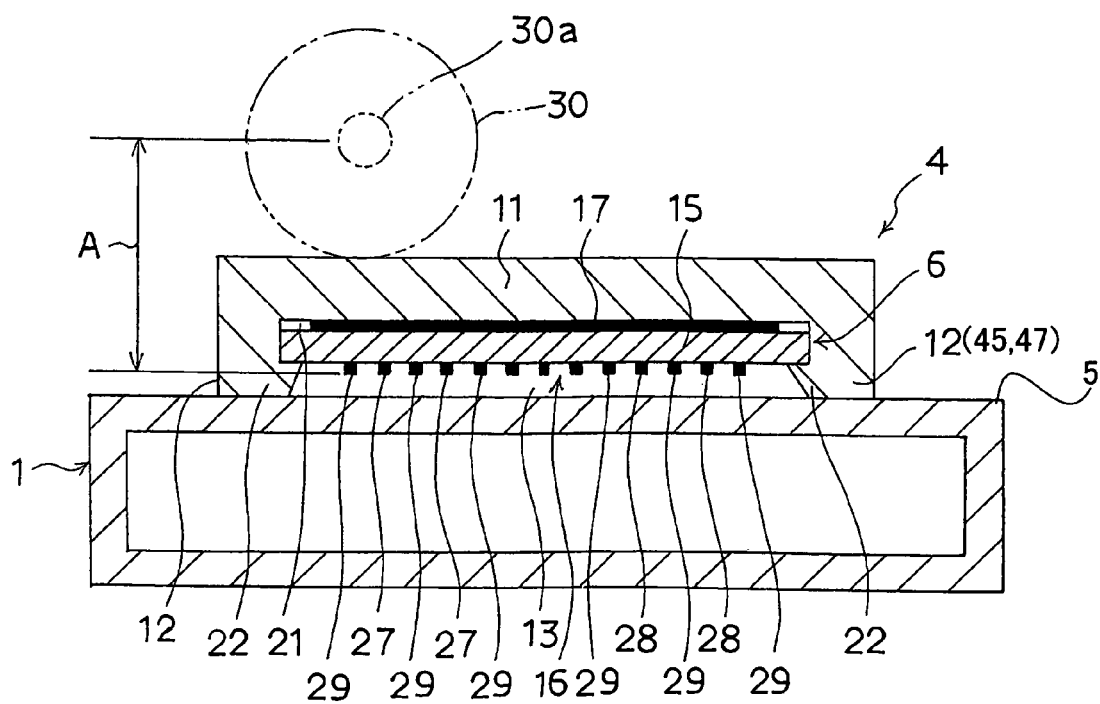
FIG. 2 is a cutaway elevation view, in line with a direction of a width of a metallic portion of a vehicle body, of a state wherein the components depicted in FIG. 1 have been assembled.
Figure 3:
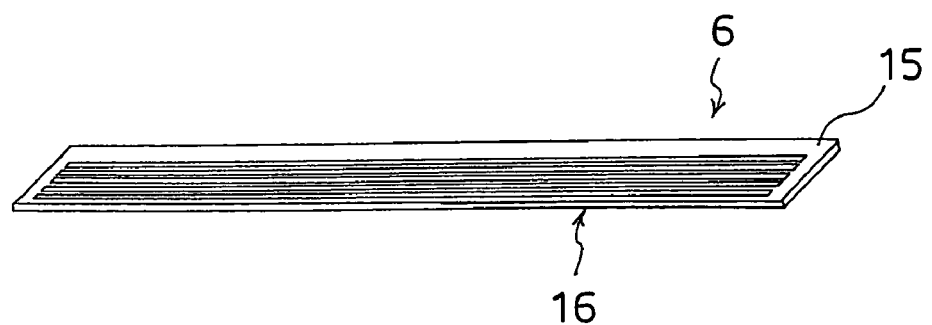
FIG. 3 is a perspective view of a surface of a module mounting portion of a harness module body proper that is employed in FIG. 2.

In the present circumstance, the module cover 11 is mounted with respect to (over) an upper (first) surface of the harness module body proper 6, i.e., a surface that is opposite to the surface of the module mounting portion 5 (i.e., opposite to a second surface of the harness module body proper 6 facing module mounting portion 5, such as is depicted in FIG. 2. The harness module body proper 6 is thus covered, i.e., enclosed, in an approximate totality of both surfaces thereof by the module cover 11 and the module mounting portion 5, at a minimum. Put another way, both surfaces of the harness module body proper 6 are sandwiched by the module cover 11 and the module mounting portion 5, in a state in which the harness module body proper 6 is surrounded over an entire surface thereof, at a minimum. It is normally possible to create the module cover 11 from a suitable resin.

In addition, the module cover 11 includes a grounding portion 12, with respect to the module mounting portion 5, wherein the harness module body proper 6 is treated as being supported in isolation thereof, in a non-contact state with respect to the module mounting portion 5, by way of the grounding portion 12 thereof. In the present circumstance, the harness module body proper 6 comprises a required interstice 13 in a direct facing direction with respect to the module mounting portion 5 (i.e., the interstice 13 is between the harness module body proper 6 and the module mounting portion 5 to eliminate contact therebetween), wherein the harness module body proper 6 is supported in isolation thereof, in an approximately parallel manner thereupon. It is to be understood that it would be possible to set the required interstice 13 to a typical thickness of the module cover 11 or to a degree of thickness of the harness module body proper 6.

It is to be understood that the configuration described herein is shared in common according to each respective embodiment to be described hereinafter.

According to the embodiment, it is presumed that the harness module body proper 6 comprises a longitudinal substrate 15 (i.e., a print substrate or a substrate portion) which extends in a direction of a length of the module mounting portion 5 (i.e., in a direction of approximately the width of the vehicle with regard to the steering support member 1, i.e., the metallic vehicle body portion. It is presumed that the longitudinal substrate 15 is thus locked and secured in place by a hook portion 22, which is installed upon an internal portion of the grounding portion 12. In such a circumstance, it would be desirable for the module cover 11 to include an electroconductivity characteristic. As an instance thereof, it would be permissible for the module cover 11 to be configured of a conductive plastic or a conductive rubber. Alternatively, it would also be permissible for the module cover 11 to include an electroconductivity characteristic, by embedding an electroconductive material, i.e., such as a surface material, of a shape that is approximately identical to a shape of the module cover 11, within an interior portion thereof.

Put more concretely, as an instance thereof, by treating the module cover 11 as comprising a shape that is parallel with the longitudinal substrate 15 and a size larger than the longitudinal substrate 15, as well as setting the grounding portion 12, which is longer than a thickness of the longitudinal substrate 15, facing the module mounting portion 5 from an edge circumference of the module cover 11, so as to be approximately directly facing thereupon in a lengthwise manner thereof, an overall shape thereof is formed into a cutaway square bracket shape, facing in a downward direction, including an aperture that opens toward the module mounting portion 5. Thus, it is presumed that the length substrate 15 is housed within a housing space 21, which is formed within an internal portion of the module cover 11 and the grounding portion 12. Thus, it is presumed that the longitudinal substrate 15 that is housed within the housing space 21 is mounted so as to be locked and secured in place by a locking surface of the hook portion 22, which is formed on the internal portion of the grounding portion 12 thereof. A lock height of the longitudinal substrate 15 is set by a locking surface setting position thereof. It is possible for the hook portion 22 to comprise an induction taper portion upon an interior portion thereof, which guides the longitudinal substrate 15 to the housing space 21. It is to be understood that it would be permissible for the grounding portion 12 to be installed so as to be linked contiguously with respect to an overall circumference of an edge circumference portion of the module cover 11. Alternatively, it would be permissible as well for the grounding portion 12 to be installed so as to be linked in line with a long edge portion of the edge circumference portion of the module cover 11, at a minimum. Alternatively, it would be permissible as well for the grounding portion 12 to be treated as a noncontiguous or an intermittent portion thereof, rather than the contiguous portion as described herein.

Conversely, a signal wire portion 16 is installed upon the surface of the module mounting portion 5 facing the longitudinal substrate 15, i.e., the substrate portion, of the harness module body proper 6. In addition, a ground portion 17, i.e., a grounding shield, is installed upon the surface of the module cover 11 of the length substrate 15. Furthermore, the ground portion 17 is presumed to be electrically connected to the steering support member 1, i.e., the metallic vehicle body portion.

The longitudinal substrate 15 is formed in an approximately parallelogram plate shape, i.e., a rectangular shape. In such a circumstance, the signal wire portion 16, which is installed upon the surface of the module mounting portion 5 side thereof, is formed as a printed wire comprising a plurality of wire patterns that extend in the direction of the length of the substrate 15. Conversely, a connector portion 25 is installed as appropriate upon the surface facing the module cover 11, such as is depicted in FIG. 1, and which applies in a similar manner hereinafter. In addition, the ground portion 17 is installed thereupon within in a component excluding the connector portion 25 or the edge circumference portion thereof.

In the present circumstance, it would be possible to treat the ground portion 17 as a painted conductor layer, which is formed in a thorough painted shape across approximately an entire surface of the portion described therein. Treating the ground portion 17 as the painted conductor layer allows forming the ground portion 17 with ease. In addition, it would also be possible for the ground portion 17 to be treated as a grounding pattern that is formed so as to correspond to each respective wire that configures the signal wire portion 16 (not shown). Treating the ground portion 17 as the grounding pattern allows reliably shielding of the signal wire portion 16 on a per wire basis.

It is to be understood that the module cover 11 encloses an outer circumference component of the connector portion 25, upon a location that corresponds to the connector portion 25. In addition, a connector cover portion 26 is installed thereupon, which exposes a terminal portion of the connector portion 25, in a direction that is external thereto, as is depicted in FIG. 1, and which applies in a similar manner hereinafter.

Furthermore, the signal wire portion 16 comprises, at a minimum, a signal wire 27, a power supply wire 28 (i.e., a noise source that is interior thereto), and a grounding wire 29, i.e., a guard grounding, which is to be understood to differ from the ground portion 17, and which separates the signal wire 27 and the power supply wire 28. Such a structure thereof ensures a shielding characteristic against the noise of the interior portion thereof, permits significantly increasing a shielding characteristic thereof, and facilitates positioning of an electrical component 30, which is capable of generating a noise, at a close range A, such as within 500 mm (100 mm, as an instance thereof), as an instance thereof.

Figure 4:
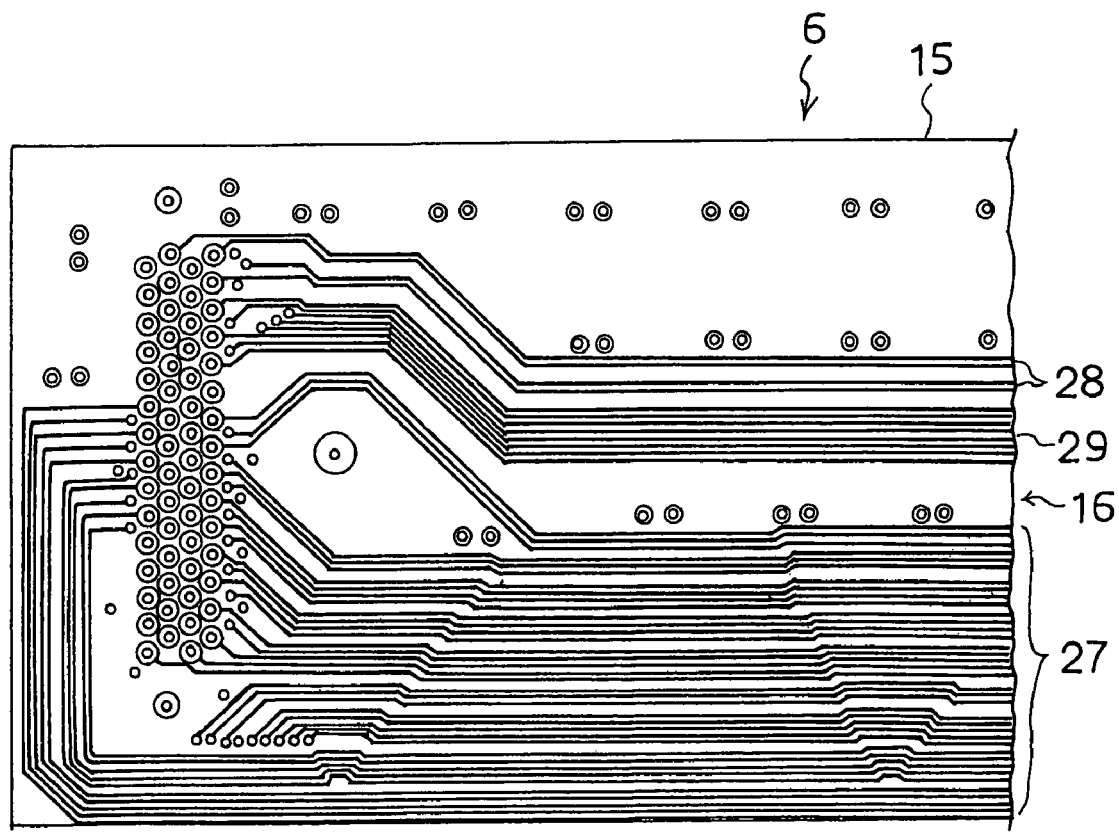
FIG. 4 is an enlarged plan view of a portion of FIG. 3.

In the present circumstance, it would also be permissible to install the grounding wire 29 with respect to both sides of each respective signal wire 27 thereof, as is depicted in FIG. 2. In a similar manner, it would also be permissible to install the grounding wire 29 with respect to both sides of each respective power supply wire 28 thereof. Doing so allows reliably shielding of each respective wire that configures the signal wire portion 16 on a per wire basis. In addition, it would also be permissible to install the grounding wire 29 with respect to both sides of the plurality of signal wires 27, as well as to install the grounding wire 29 with respect to both sides of the plurality of power supply wires 28. It would instead be possible as well to sort out the signal wire 27 from the power supply wire 28, and to isolate, i.e., to compartmentalize, the signal wire 27 and the power supply wire 28, by installing the grounding wire 29 upon a boundary portion therebetween, as is depicted in FIG. 4. Doing so allows reliably and systematically separating the signal wire 27 and the power supply wire 28. Alternatively, it would also be permissible to presume a configuration that combines the signal wire 27, the power supply wire 28, and the grounding wire 29. The grounding wire 29 is connected to either the ground portion 17 or the steering support member 1 (not shown).

It is to be understood that the electrical component 30, which is capable of generating the noise, may comprise an electric motor, an inverter, or an electric power supply device. Reference numeral 30a in FIG. 2 is a power supply circuit of the electrical component 30.

Figure 5:
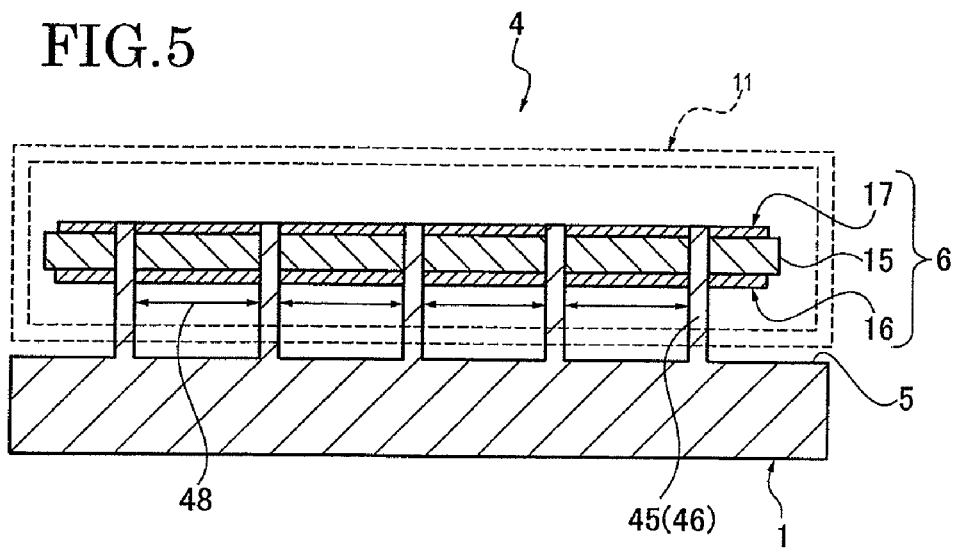
FIG. 5 is an elevation view, i.e., at a multiple point grounding, of the harness module body proper that is employed in FIG. 2.
Figure 6:
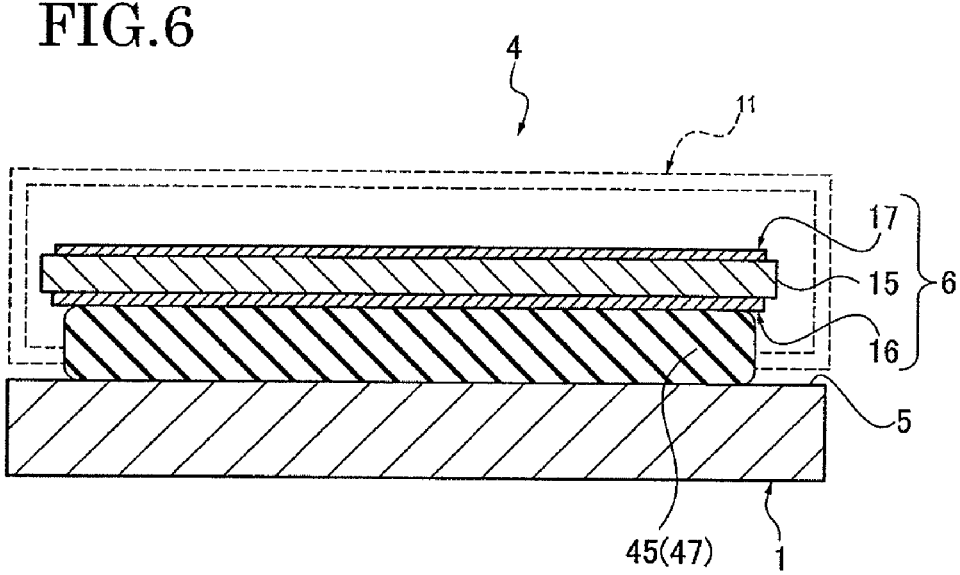
FIG. 6 is an elevation view, i.e., at either a line grounding or a plane grounding, of the harness module body proper that is employed in FIG. 2.
Figure 7:
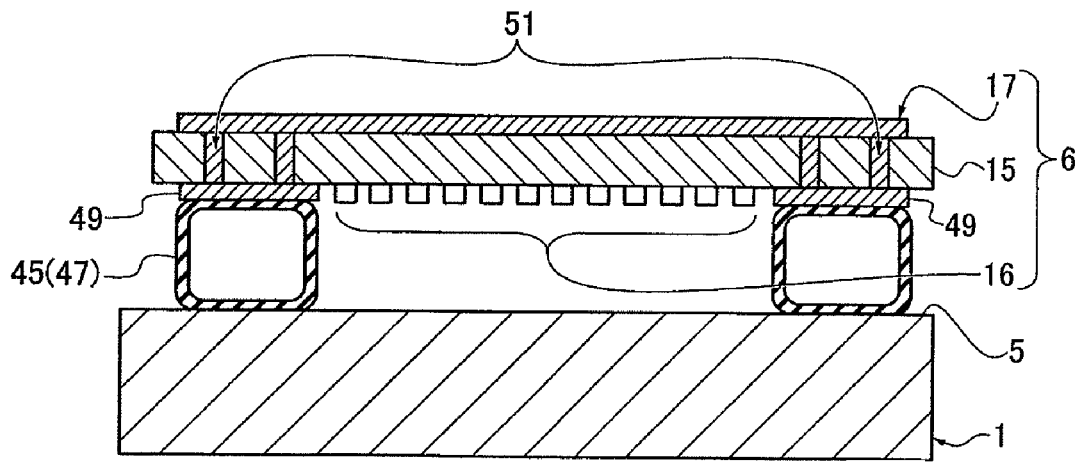
FIG. 7 is a cutaway elevation view, in line with a direction of a width of a metallic portion of a vehicle body, of a metallic vehicle body portion according to FIG. 6.

The ground portion 17 is treated as being electrically grounded with regard to the steering support member 1, i.e., the metallic vehicle body portion, either by way of a multiple point grounding, as is depicted in FIG. 5, or a line grounding or a plane grounding, as is depicted in FIG. 6 and FIG. 7.

As an electrical grounding unit 45, which is for grounding the ground portion 17 upon the steering support member 1, i.e., the metallic vehicle body portion, it would be conceivable to directly use the module cover 11, as well as a device other than the module cover 11 thereof.

When directly using the module cover 11, the module cover 11 is configured from the conductive plastic or the conducting rubber, as is described herein. The ground portion 17 is thus electrically connected to the module cover 11. The ground portion 17 is thereby connected to the steering support member 1 by way of the grounding portion 12. Put another way, the grounding portion 12 serves as the electrical grounding unit 45. It is to be understood that the electrical connection between the ground portion 17 and the module cover 11 is easily implemented by placing the ground portion 17 and the module cover 11 thereof in a contact position. It would instead be permissible to install a connecting wire (not shown) between the ground portion 17 and the module cover 11 thereof. In such a circumstance, the grounding portion 12 comprises the multiple point grounding, when the grounding portion 12 is presumed to be noncontiguous, and the grounding portion 12 thereof comprises either the line grounding or the plane grounding, when the grounding portion 12 is presumed to be contiguous.

In a circumstance other than the circumstance described herein, an electroconductive material 46 and 47 would be employed, as an example thereof. Put another way, it would be possible to install, between the ground portion 17 of the longitudinal substrate 15 (i.e., the substrate portion) and the module mounting portion 5 of the steering support member 1 (i.e., the metallic vehicle body portion) an electroconductive material 46, such as an electrical wire or a metallic wire, as is depicted in FIG. 5, or an electroconductive material 47, such as the conductive plastic or the conducting rubber, as is depicted in FIG. 6 and FIG. 7.

In the present circumstance, the electroconductive material 46, such as the electrical wire or the metallic wire, as is depicted in FIG. 5, is mounted so as to approximately directly face the longitudinal substrate 15, i.e., the substrate portion, as well as the module mounting portion 5 of the steering support member 1. The electroconductive material 46 also comprises a required distance 48 between grounding, the multiple point grounding being formed by a plurality of the wires thereof being arranged thereupon.

It is to be understood that, in a circumstance wherein the multiple point grounding, such as is depicted in FIG. 5, is presumed to apply, it would be desirable to further set the distance 48 between grounding with respect to the direction of the length to such as $\lambda/10$ to $\lambda/20$, i.e., a frequency band that is not prone to absorbing a radiation.

In addition, the electroconductive material 47, such as the conductive plastic or the conducting rubber, as is depicted in FIG. 6 and FIG. 7, is set lengthwise in the direction of the length as described herein, and is interposed in a spacer shape in a left and a right pair thereof, between both sides of the length substrate 15, i.e., the substrate portion, and the module mounting portion 5 of the steering support member 1, i.e., the metallic vehicle body portion. Thus, an edge portion ground part 49 is installed at a portion of both sides of the electroconductive material 47 that makes contact with the signal wire portion 16 of the longitudinal substrate 15, i.e., the substrate portion, and which extends in the direction of the length. The edge portion ground part 49 and the corresponding electroconductive material 47 is caused to make either a linear contact or a planar contact therewith, in the direction of the length thereof. Furthermore, a pass through opening 51 is formed upon both sides of the longitudinal substrate 15, wherein the edge portion ground part 49 and the electroconductive material 47 is caused to be electrically connected therewith, by way of the pass through opening 51 thereof. It is presumed that the ground portion 17 comprises either the line grounding or the plane grounding, by way of such a configuration as is described therein. In such a circumstance, the electroconductive material 47 is formed into the plane grounding, which comprises a rectangular cross section thereupon.

When employing the electroconductive material 46 and 47, it is also possible to embed the electroconductive material 46 and 47 within the module cover 11. It is to be understood that it would also be possible either to use, or to share, the electroconductive material thereof, i.e., the electroconductive material that is embedded within the module cover 11, as a shape that is approximately identical to the shape of the module cover 11.

With regard to the configuration of the harness module body proper 6 and the configuration of the component that is peripheral thereto, it is to be further understood that, while it would be possible to apply the configuration to the harness module 4 according to the present embodiment and to an embodiment to be described hereinafter, it would also be possible to apply the configuration thereof to a harness module other than the harness module described herein.

Following is a description pertaining to an effect of the harness module device that is configured in a manner that is similar to the configuration according to the embodiment.

By forming the module mounting portion 5 upon an obverse surface of the steering support member 1, i.e., the metallic vehicle body portion, and positioning the harness module 4 upon the module mounting portion 5, it is possible to implement a simplification of the structure with regard to a harness component, by reducing a quantity of components that are required. It is thereby possible to obtain a reduced weight or an ease of working with the harness module device.

In addition, the harness module 4 includes the harness module body proper 6, and the module cover 11, which is capable of protecting the harness module body proper 6. The harness module 4 is configured so as to be capable of being enclosed, approximately over the entirety of both sides thereof, at a minimum, by the module cover 11 and the module mounting portion 5, by the module cover 11 being mounted upon the side of the harness module body proper 6 that is opposite from the module mounting portion 5 thereof. In addition, the module cover 11 includes the grounding portion 12, with respect to the module mounting portion 5, and it is possible for the module cover 11 thereof to be treated as a structure that is effective in ensuring a shielding characteristic with respect to the harness module body proper 6, thus preventing an effect of a noise from an external source thereto, by the harness module body proper 6 being supported in an isolation thereof by the grounding portion 12 in a non-contact state with respect to the module mounting portion 5 thereof.

According to a particular configuration of the present embodiment, it is possible to simply and reliably maintain the longitudinal substrate 15 with regard to a simplified structure of the module cover 11, by way of the harness module body proper 6 that comprises the longitudinal substrate 15, which extends in the direction of the length of the module mounting portion 5. The longitudinal substrate 15 is locked and secured in place by the hook portion 22, which is installed upon an internal portion of the grounding portion 12. In addition, it is possible to ensure the shielding characteristic with regard to the longitudinal substrate 15 by either configuring the module cover 11 with the conductive plastic or the conducting rubber, or by embedding the electroconductive material, i.e., such as the surface material thereof, within the module cover 11 thereof.

Furthermore, with the harness module device, the module mounting portion 5 is formed upon the obverse surface of the metallic vehicle body portion, i.e., the steering support member 1, and the harness module 4 is positioned upon the module mounting portion 5. The harness module 4 comprises the harness module body proper 6 and the module cover 11 that is capable of protecting the harness module body proper 6. The harness module body proper 6 comprises the substrate portion, i.e., the longitudinal substrate 15, and the signal wire portion 16 is installed in the non-contact state facing the surface of the module mounting portion 5, and approximately parallel thereto. The ground portion 17 is installed on module mounting portion 5 facing the module cover 11, and the ground portion 17 is electrically connected to the metallic vehicle body portion. Sandwiching the signal wire portion 16 between the ground portion 17 and the module mounting portion 5 ensures the shielding characteristic with respect to the noise that is external thereto, thereby eliminating a necessity for layering the longitudinal substrate 15 or configuring the module cover 11 to be of a metallic substance in order to shield the internal configuration thereof from the noise that is external thereto, and thereby achieving the reduced weight or the lower cost as a consequence thereof. It is to be understood that it would be possible to ensure a double shielding characteristic thereupon by combining the shielding characteristic by way of the module cover 11 and the shielding characteristic by way of the ground portion 17.

In addition, treating a single surface of the substrate portion, i.e., the longitudinal substrate 15, as the signal wire portion 16, by way of a printed circuit wiring thereupon, completely eliminates (a thick bundle of) misaligned wiring, thereby achieving the reduced weight or the ease of working with the harness module device thereof to a degree commensurate therewith.

Furthermore, even if a malfunction occurs as a result of the noise, the wiring location of the signal wire portion 16 is anchored in place. Therefore, because there is reproducibility to the malfunction, this easily allows a countermeasure to be taken in order to reliably prevent a recurrence thereof.

By way of the signal wire portion 16 comprising, at a minimum, the signal wire 27 and the power supply wire 28, i.e., the noise source that is internal thereto, and the grounding wire 29 being installed that separates the signal wire 27 from the power supply wire 28 thereof, it becomes possible to ensure the shielding characteristic with regard to the noise that is internal thereto. The shielding characteristic thereof is significantly reinforced thereby, and it is thus possible, as an instance thereof, to avoid incurring a fault even if the electrical component 30, which is capable of generating the noise thereupon, is positioned at the extreme close range A, such as within 500 mm (100 mm, as an instance thereof).

Furthermore, electrically grounding the ground portion 17 by way of either the multiple point grounding, the line grounding, or the plane grounding, with respect to the metallic vehicle body portion, i.e., the steering support member 1, at a close range on the order of the interstice 13, allows reducing an impedance of the ground portion 17, and improving the shielding characteristic thereof, and in particular, a high frequency band shielding characteristic thereof.

In addition, when treating the grounding thereof as the multiple point grounding, it is further possible to improve the shielding characteristic of the high frequency band by setting the distance between grounding 48 to the $\lambda/10$ to $\lambda/20$ frequency band that is not prone to absorbing the radiation thereupon.

Even when causing the grounding thereof to be performed, depending upon a circumstance thereof, by the grounding portion 12, i.e., the electrical grounding unit 45, it is to be understood that it would also be permissible to cause the grounding thereof to be performed by installing a wire or an intervening substance including a conductivity, i.e., the electroconductive material 46 and 47, as an instance thereof.

Second Embodiment

FIG. 8 to FIG. 12 illustrate a second embodiment that describes the present invention in a concrete manner. It is to be understood that a description of a configuration herein that is identical to the configuration that is described according to the first embodiment will be omitted in order to avoid a redundancy. It is possible, however, to treat the disclosure provided herein as a disclosure according to the second embodiment where necessary. In addition, it is possible, in a circumstance other than the circumstance thereof, wherein a configuration is labeled with a reference numeral that is identical to the reference numeral of each respective preceding embodiment, to presume that it would be possible to treat the configuration thereof as a reference numeral that is identical to the reference numeral therewith, or that is equivalent thereto, and that it would also be possible to employ the description of the portion thereof to treat the configuration thereupon as a disclosure of the second embodiment.

According to the second embodiment, the harness module body proper 6 comprises a pair of substrates, i.e., a pair of print substrates, 31 and 32, further comprising an interstice in a lengthwise direction of the module mounting portion 5 with respect to the metallic vehicle body portion, such as the steering support member 1, and a tape wire 33, which connects the pair of substrates 31 and 32 thereof.

It is to be understood that it would be possible to adopt, with regard to each of the pair of substrates 31 and 32, respectively, a configuration that is approximately similar to the configuration of the substrate portion, i.e., the longitudinal substrate 15, according to the first embodiment. As an instance thereof, it would be possible to install the signal wire portion 16 upon the module mounting portion 5 surface thereof, to install the ground portion 17 upon the module cover 11 surface thereof, to separate the signal wire 27 and the power supply wire 28 of the signal wire portion 16 with the grounding wire 29, or to electrically ground, i.e., at a close range, the ground portion 17, with regard to the metallic vehicle body portion, by way of either the multiple point grounding, the line grounding, or the plane grounding; refer to the first embodiment and FIG. 1 to FIG. 7 thereof as necessary.

The tape wire 33 is configured in a tape form by linking a plurality of electrical wires in a flat plane manner. While the steering support member 1 is presumed not to be configured in an angular pipe shape according to the present embodiment, it is to be understood that it would be possible to install the module mounting portion 5 without difficulty even if such a configuration were present thereupon. In such a circumstance, the harness module 4 is attached so as to protrude horizontally from the module mounting portion 5; refer to FIG. 12. In such a circumstance, the connector portion 25 is installed upon the module mounting portion 5 surface with respect to the longitudinal substrate 15 upon the portion of the longitudinal substrate 15 that protrudes horizontally from the module mounting portion 5. An overall structure of the harness module 4 and the steering support member 1 is thus configured so as to comprise a lighter weight than would conventionally be achieved.

In addition, the module cover 11 is mounted with respect to the pair of substrates 31 and 32 and the tape wire 33, and it is presumed that the module cover 11 thereof is manufactured from the conducting rubber, i.e., a module cover manufactured from a conducting rubber 34. While it would be possible to presume that a mounting unit between the module cover manufactured from the conducting rubber 11 and the harness module body proper 6 would be an arbitrary mounting unit thereupon, it is presumed that the module cover that is manufactured from the conducting rubber is used as the module cover 11 in FIG. 11 and FIG. 12, and an encasing maintenance substitute 34a, which is capable of being mounted and locked upon the harness module body proper 6, is installed so as to enclose a reverse side of an edge portion of the harness module body proper 6 (i.e., the side of the module mounting portion 5, upon an edge portion of the module cover 11).

Furthermore, an under (bottom) cover 35 is interposed between the harness module body proper 6 and the module mounting portion 5. In such a circumstance, the under cover 35 comprises a lower surface portion, which is parallel to the harness module body proper 6 and the module cover 11, and is also a size larger than the harness module body proper 6 and the module cover 11 thereof, and an at least partial side wall portion, which covers a side surface of the harness module body proper 6 and the module cover 11. The under cover 35 is configured so as to contain the harness module body proper 6, and such that the module cover 11 is capable of being fitted therewithin with approximately no interval therebetween. An upper surface of the lower surface portion of the under cover 35 comprises an uneven shape that corresponds approximately to a lower surface of the substrate 31 and 32 and the tape wire 33. An interval is formed as necessary between the lower surface portion of the under cover 35 and the pair of substrates 31 and 32. The under cover 35 is configured of such as a conventional resin that does not comprise a conductivity characteristic. It is to be understood that it would also be permissible for the under cover 35 to be configured of the conductive rubber or the conductive plastic, provided that the under cover 35 is not caused to affect the signal wire portion 16. The under cover 35 thereby performs a function as a spacer material, as well as of a material that contains and protects the harness module body proper 6.

The grounding portion 12 is presumed to be a rib, i.e., a strut portion, 37, which is capable of passing through a perforation 36 that is formed upon the under cover 35, and making a contact with the module mounting portion 5. In such a circumstance, the rib 37 is presumed to be a partial component. The rib 37 is installed as appropriate upon both edge portions of the module cover 11 or a center portion thereof. The rib 37 is installed with respect to both sides in a width direction of the module cover 11. In the circumstance depicted in FIG. 12, the rib 37 is set so as to protrude from a lower surface portion of the encasing maintenance substitute 34a.

The rib 37 extends as is into becoming the electrical grounding unit 45 for the multiple point grounding. Accordingly, it would also be possible to install a plurality of the ribs 37 at the distance 48 between grounding. In addition, if the rib 37 is presumed to extend in the lengthwise direction of the module mounting portion 5 (i.e., in approximately the direction of the width of the vehicle), it would also be possible to treat the rib 37 thereof as either the line grounding or the plane grounding.

Figure 8:
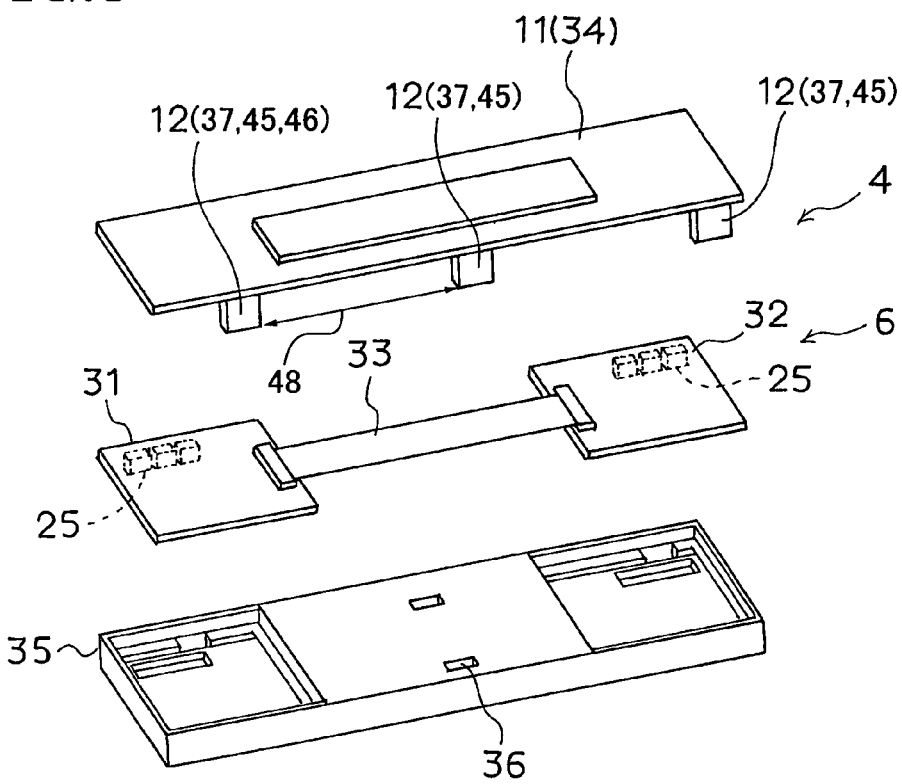
FIG. 8 is an exploded perspective view of a harness module device according to a second embodiment of the present invention.
Figure 9:
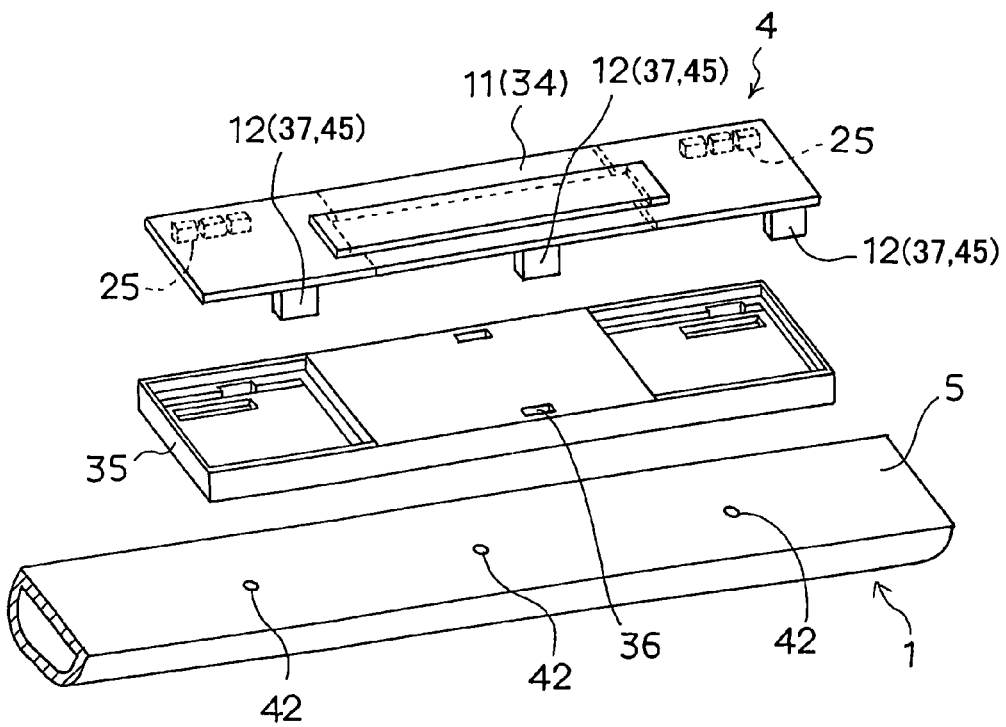
FIG. 9 is an exploded perspective view depicting a state wherein a module cover is mounted upon a harness module body proper that is depicted in FIG. 8.
Figure 10:
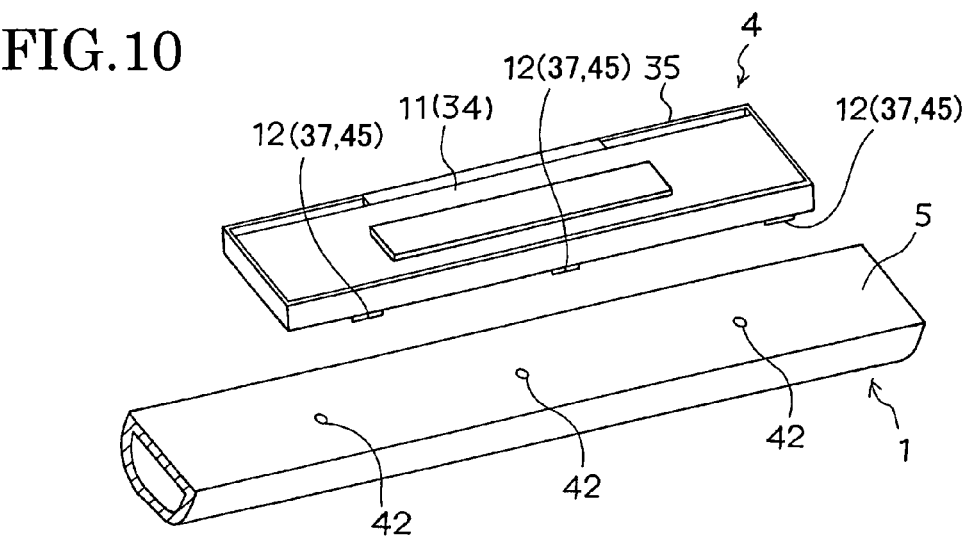
FIG. 10 is an exploded perspective view depicting a state wherein an under cover is mounted upon the module cover that is depicted in FIG. 9.
Figure 11:
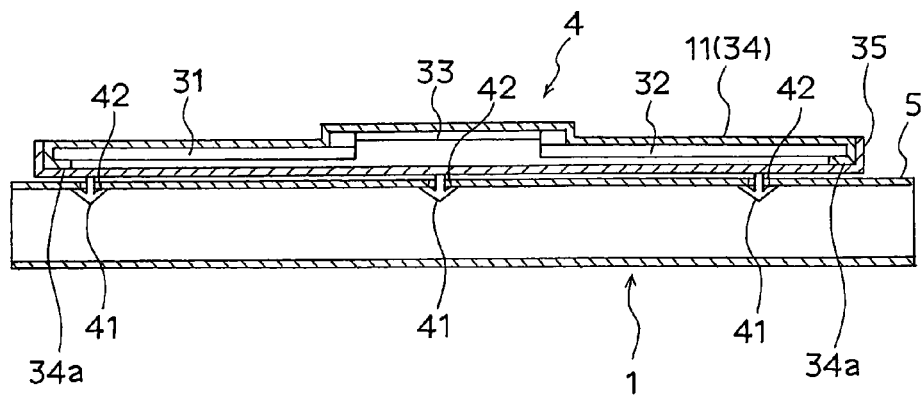
FIG. 11 is a cutaway elevation view, in line with a direction of a length of a metallic portion of a vehicle body, of a state wherein the components depicted in FIG. 1 have been assembled.
Figure 12:
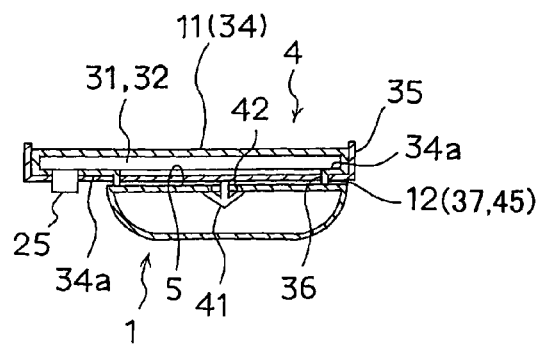
FIG. 12 is a cutaway elevation view that is orthogonal to the cutaway elevation view that is depicted in FIG. 11.
Figure 13:
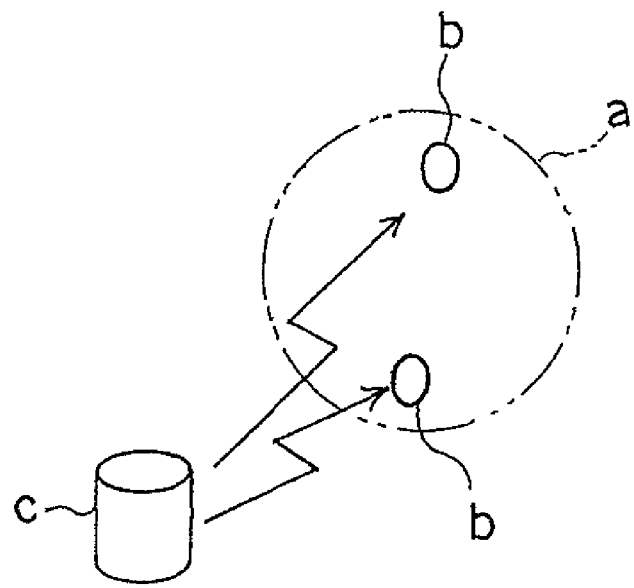
FIG. 13 is a cutaway view of a conventional wire harness.
Figure 14A:
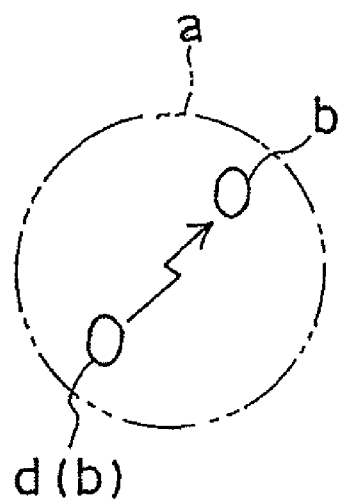
FIG. 14A is a cutaway view that depicts a misalignment of a wiring location according to the wire harness that is depicted in FIG. 13.
Figure 14B:
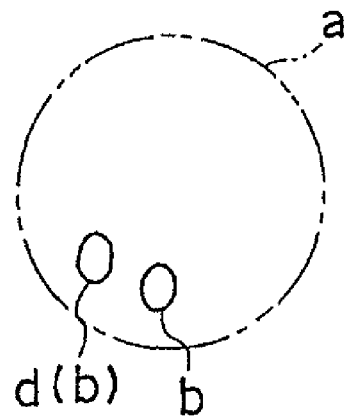
FIG. 14B is a cutaway view that depicts a misalignment of a wiring location according to the wire harness that is depicted in FIG. 13.

The harness module body proper 6 is in a state wherein the module cover 11 and the under cover 35 is mounted thereupon, and the harness module body proper 6 is mounted upon the module mounting portion 5 of the steering support member 1, such as is depicted in FIG. 8 to FIG. 10. As an instance thereof, the mounting thereof is performed by mating a clip portion 41, which is set to protrude from a reverse surface of the under cover 35, with a mounting perforation 42, which is formed at a location that corresponds to the module mounting portion 5. It is presumed that the under cover 35 functions as a mounting material with respect to the steering support member 1. It is to be understood that it would be possible for a mounting structure that employs the clip portion 41 and the mounting perforation 42 to be adopted as well for the mounting of the module cover 11 according to the first embodiment.

It is to be understood that the configuration described herein is approximately similar to the configuration according to the first embodiment, and a component that is common thereto will be treated as a disclosure according to the second embodiment, using a disclosure according to the first embodiment.

Following is a description of an effect according to the second embodiment.

According to the embodiment, the harness module body proper 6 comprises the pair of substrates 31 and 32, which further comprises an interstice positioned therebetween, in the lengthwise direction of the module mounting portion 5, and the tape wire 33, which connects the pair of substrates 31 and 32 across the interstice therebetween. The module cover 11 is mounted upon the pair of substrates 31 and 32 and the tape wire 33. It is presumed that the module cover 11 is manufactured of the conductive rubber, the under cover 35 is interposed between the harness module body proper 6 and the module mounting portion 5, the harness module body proper 6 is enclosed with the module cover that is manufactured of the conductive rubber 11 and the module mounting portion 5, by way of the grounding portion 12 being presumed to be the rib 37 that is capable of passing through passing through the perforation 36 that is formed upon the under cover 35, and of making contact with the module mounting portion 5 thereupon, whereby the shielding characteristic is ensured with respect to the noise that is external thereto. The necessity for layering the longitudinal substrate 15 or forming the module cover 11 of a metallic substance for the shielding purpose thereof is thus eliminated, thereby allowing obtaining a reduced weight and a lower cost thereupon.

In addition, presuming that the grounding portion 12 is the rib 37 that extends from the module cover 11 is manufactured from the conductive rubber, a low order noise is prevented by absorbing an oscillation. It is to be understood that the rib 37 also functions as an electrical connection material that electrically connects the module cover 11 and the module mounting portion 5. As a consequence thereof, the rib 37 itself includes a configuration for the multiple point grounding. In addition, when the line grounding or the plane grounding is presumed, it is further presumed that an interposing element, comprising the electroconductivity, is interposed between the rib 37 and the metallic vehicle body portion as a material for grounding thereof.

Furthermore, treating the harness module body proper 6 as a structure that connects the pair of substrates 31 and 32 by way of the tape wire 33 eliminates (the thick bundle of) the misaligned wiring, thereby achieving the reduced weight or the ease of working with the harness module device to a degree commensurate therewith.

Moreover, presuming a configuration that does not employ the longitudinal substrate 15 makes an infrastructure for manufacturing the longitudinal substrate 15 unnecessary, thereby allowing a lower cost or an improvement in productivity thereof.

According to the present invention, forming a module mounting portion upon an obverse surface of a metallic vehicle body portion and installing a harness module upon the module mounting portion thereof allows reducing a quantity of a necessary component, and thereby simplifying a structure thereof. It is thereby possible to achieve the reduced weight or the greater ease of working with the device. In addition, the harness module includes a harness module body proper, and a module cover, which is capable of protecting the harness module body proper thereof. The harness module body proper is configured so as to be capable of being enclosed over approximately an entirety of both surfaces thereof, at a minimum, by the module cover and the module mounting portion, by way of the module cover being mounted upon a side of the harness module body proper that is opposite to the side thereof whereupon is mounted the module mounting portion. In addition, the module cover comprises a grounding portion with respect to the module mounting portion, and the harness module body proper is treated as being supported in isolation thereof in a non-contact state with respect to the module mounting portion, by way of the grounding portion thereof. It is thereby possible to treat the configuration according to the present invention as a structure that is effective in ensuring a shielding characteristic with respect to the harness module body proper, and in preventing an effect of a noise that is external thereto.

In addition, the harness module body proper comprises a longitudinal substrate that extends in a direction of a length of the module mounting portion. It is possible to cause the length substrate thereof to be simply and reliably maintained with regard to a module cover with a simplified structure thereof, by way of the length substrate thereof being locked and secured in place by a hook portion, which is installed upon an internal portion of the grounding portion. In addition, it would be possible to ensure the shielding characteristic with respect to the length substrate either by configuring the module cover with a conductive plastic or a conductive rubber, or by embedding an electroconductive material, such as a surface material, within an interior portion of the module cover thereof.

In addition, the harness module body proper comprises a pair of substrates which are installed so as to comprise an interstice therebetween in a lengthwise direction of the module mounting portion, and a tape wire which connects the pair of the substrate thereof. The pair of the substrate thereof and the tape wire is mounted upon the module cover, the module cover is presumed to be manufactured of a conductive rubber, an under cover is interposed between the harness module body proper and the module mounting portion, and the grounding portion is formed into a rib that passes through a perforation that is formed upon the under cover and that is capable of making contact with the module mounting portion. The shielding characteristic with respect to a noise that is external thereto is thus ensured by the harness module body proper being enclosed by the module cover that is manufactured of the conductive rubber and the module mounting portion, thus in turn eliminating a necessity for layering the length substrate or configuring the module cover to be of a metallic substance in order to shield the internal configuration thereof from the noise that is external thereto, thus in turn allowing a reduced weight or a lower cost as a consequence thereof. In addition, presuming that the grounding portion is the rib that extends from the module cover that is manufactured from the conductive rubber prevents a low order noise by absorbing an oscillation.

It is to be understood that the rib also comprises a function as an electrical connection material that electrically connects the module cover and the module mounting portion. Furthermore, treating the harness module body proper as a structure that connects the pair of substrates by way of the tape wire eliminates (a thick bundle of) misaligned wiring, achieving the reduced weight or the ease of working with the harness module device thereof to a degree commensurate therewith. Moreover, presuming a configuration that does not employ the length substrate makes an infrastructure for manufacturing the length substrate unnecessary, allowing a lower cost or an improvement in productivity thereof.

In addition, with regard to a harness module device that forms a module mounting portion upon the obverse surface of the metallic vehicle body portion, and which installs a harness module upon the module mounting portion, the harness module comprises a harness module body proper and a module cover that is capable of protecting the harness module body proper thereof. The harness module body proper comprises a substrate that is installed in a non-contact state and approximately parallel to the module mounting portion. A signal wire portion is installed upon a surface of the module mounting portion side thereof, and a ground portion is installed upon a surface of the module cover side thereof. The ground portion thereof is electrically connected to the metallic vehicle body portion, thereby ensuring that a shielding characteristic with respect to the noise that is external thereto is ensured by sandwiching the signal wire portion of the substrate between the grounding portion and the module mounting portion, thus in turn eliminating the necessity for layering the length substrate or configuring the module cover to be of a metallic substance in order to shield the internal configuration thereof from the noise that is external thereto, thereby achieving the reduced weight or the lower cost as the consequence thereof. In addition, treating a single surface of the substrate portion as the signal wire portion completely eliminates the misaligned wiring, allowing the reduced weight or the ease of working with the harness module device thereof to a degree commensurate therewith. Furthermore, even if a malfunction occurs as a result of the noise, the wiring location of the signal wire portion is anchored in place. The malfunction thereof is thus reproducible as a consequence, easily allowing a countermeasure to be taken to reliably prevent a recurrence thereof.

Furthermore, the signal wire portion comprises, at a minimum, a signal wire, a power supply wire, and a grounding wire, which separates the signal wire and the power supply wire. Such a structure thereof ensures a shielding characteristic against the noise of the interior portion thereof, permits significantly increasing a shielding characteristic thereof, and facilitates positioning an electrical component, which is capable of generating a noise, at a close range, such as within 500 mm (100 mm, as an instance thereof), as an instance thereof.

Furthermore, electrically grounding (at a close range) the ground portion, by way of either the multiple point grounding, the line grounding, or the plane grounding, with respect to the metallic vehicle body portion, allows reducing an impedance of the ground portion, and improving the shielding characteristic thereof, and in particular, a high frequency band shielding characteristic thereof. In addition, when treating the grounding thereof as the multiple point grounding, it is further possible to improve the shielding characteristic of the high frequency band by setting the distance between grounding to the λ/10 to λ/20 frequency band that is not prone to absorbing the radiation thereupon. It is to be understood that it would also be permissible to cause the grounding thereof to be performed by installing a wire or an intervening substance comprising a conductivity.

It is to be understood that an effect or a result other than the foregoing is essentially identical to an effect or result according to the first embodiment, and thus, it would be possible to use the disclosure according to the first embodiment to presume the disclosure according to the second embodiment.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. In addition, it is to be understood that, if a plurality of embodiments or variations thereof are disclosed herein, a possible combination thereof is incorporated herein.

INDUSTRIAL APPLICABILITY

Whereas the present invention according to the embodiments is applied to a harness module device of a vehicle, it is to be understood that the present invention thereof is not limited to a vehicle, and it would be possible to apply the present invention to mounting a harness module with respect to a wide range of sectors.

What is claimed is:

1. A harness module comprising:
   a module mounting portion to be formed on a metallic steering support member;
   a harness module body proper to be positioned upon said module mounting portion;
   a module cover configured to cover and protect said harness module body proper, said module cover having an integral grounding portion for supporting said module cover on said module mounting portion; and
   a connector portion;
   wherein said module mounting portion and said module cover are configured to enclose approximately an entirety of both a first surface and a second surface of said harness module body proper, said module cover being mounted over said first surface of said harness module body proper, said second surface of said harness module body proper facing said module mounting portion and being opposite said first surface;
   wherein said harness module body proper is supported by said grounding portion of said module cover such that an interstice is formed between said second surface of said harness module body proper and said module mounting portion so that said harness module body proper is in a non-contact state with respect to said module mounting portion; and
   wherein said harness module body proper is positioned and configured so as to have a protruding portion protruding horizontally from said module mounting portion, said connector portion being mounted on said protruding portion of said harness module body proper.

2. The harness module according to claim 1, wherein said harness module body proper further includes a longitudinal substrate extending in a direction of a length of said module mounting portion, said longitudinal substrate being locked on a hook portion at an interior of said grounding portion of said module cover.

3. The harness module according to claim 1, wherein said harness module body proper comprises:
   a pair of substrates arranged along a direction of a length of said module mounting portion such that a second interstice is formed therebetween; and
   a tape wire located between and connecting said pair of substrates, said module cover being mounted over said pair of substrates and said tape wire, and said module cover being formed of a conductive material;
   said harness module further comprising a bottom cover between said harness module body proper and said module mounting portion; and
   wherein said grounding portion comprises a rib passing through a perforation formed in said bottom cover, said grounding portion being configured to contact said module mounting portion.

4. A harness module comprising:
   a module mounting portion to be formed on a metallic steering support member;
   a harness module body proper to be positioned upon the module mounting portion; and
   a module cover configured to protect said harness module body proper;
   wherein said harness module body proper includes:
      a substrate portion having a first surface to face said module cover and a second surface opposite said first surface so as to face said module mounting portion;
      a signal wiring portion on said second surface of said substrate portion so as to face said module mounting portion; and
      a ground portion on said first surface of said substrate portion so as to face said module cover, said ground portion being located over said signal wiring portion and being electrically connected to the metallic steering support member, said signal wiring portion being located between said ground portion and said module mounting portion.

5. The harness module according to claim 4, wherein said signal wiring portion includes:
   a signal wire;
   a power supply wire; and
   a grounding wire configured to separate said signal wire and said power supply wire.

6. The harness module device according to claim 5, wherein said ground portion is electrically grounded to the metallic steering support member by one of a multiple point grounding, a line grounding, or a plane grounding.

7. The harness module device according to claim 4, wherein said ground portion is electrically grounded to the metallic steering support member by one of a multiple point grounding, a line grounding, or a plane grounding.

* * * * *